United States Patent [19]
Oetiker

[11] Patent Number: 5,613,281
[45] Date of Patent: Mar. 25, 1997

[54] HOSE CLAMP

[76] Inventor: Hans Oetiker, Oberdorfstrasse 21, CH-8812, Horgen, Switzerland

[21] Appl. No.: 418,619

[22] Filed: Apr. 7, 1995

Related U.S. Application Data

[60] Division of Ser. No. 446,729, Dec. 6, 1989, Pat. No. 5,437,081, which is a continuation-in-part of Ser. No. 409,798, Sep. 20, 1989, Pat. No. 4,987,651, and a continuation-in-part of Ser. No. 821,749, Jan. 10, 1992, Pat. No. 5,305,499, which is a continuation of Ser. No. 922,473, Oct. 23, 1986, abandoned, which is a continuation of Ser. No. 622,765, Jun. 20, 1984, abandoned.

[51] Int. Cl.⁶ ..................................................... F16L 33/02
[52] U.S. Cl. ............................................................. 24/20 R
[58] Field of Search ........................... 24/20 LW, 20 TT, 24/20 R, 21, 23 W, 20 S Primary Examiner—James R. Brittain
Attorney, Agent, or Firm—Paul M. Craig, Jr.

[57] ABSTRACT

A band made from a material normally elastically non-stretchable in its longitudinal direction to which elastic stretchability is imparted by one or more sections which include lateral non-rectilinear band portions on both sides of the central longitudinal band plane which are concavely shaped as viewed from the central longitudinal plane to form a central window which at least approximately resembles an hourglass. The lateral non-rectilinear band portions are thereby made by cut-outs in the band along its longitudinal sides and in the center area. In one embodiment, the cut-outs along the sides are segmentally shaped while the window in the central area is made of a shape resembling an hourglass. Adjacent sections are connected with each other by transversely extending web portions delimited in the longitudinal direction by end surfaces of the central cut-outs.

28 Claims, 4 Drawing Sheets

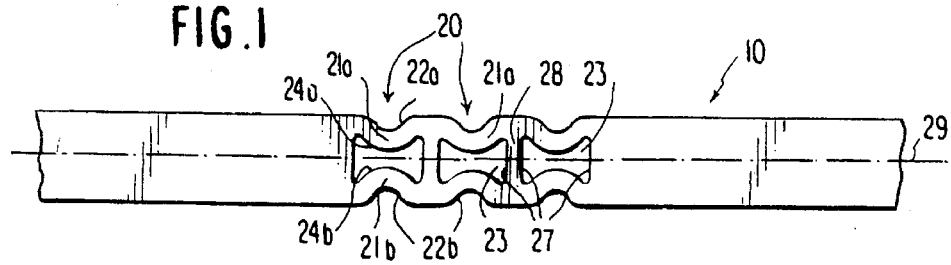
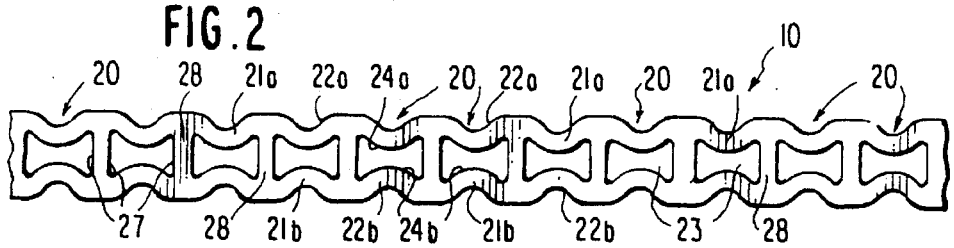
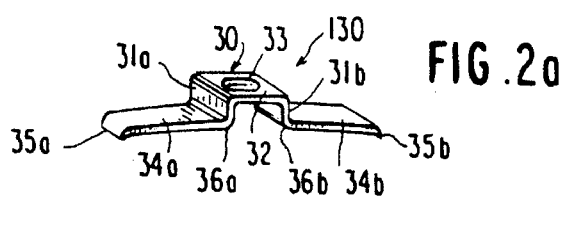
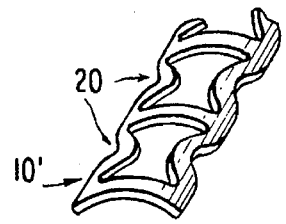
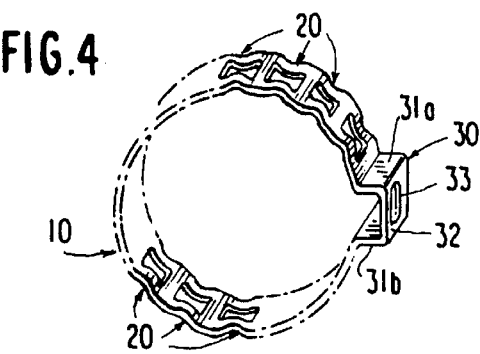
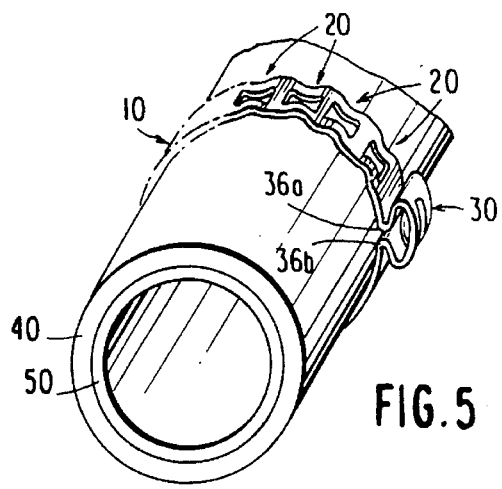
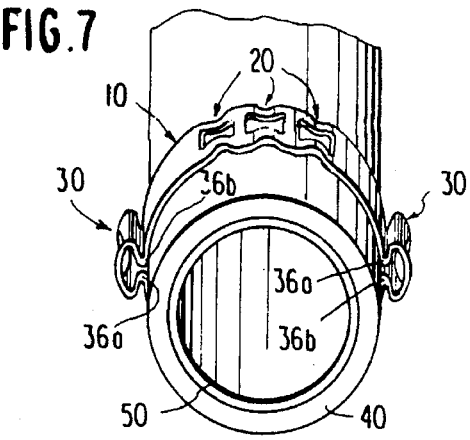
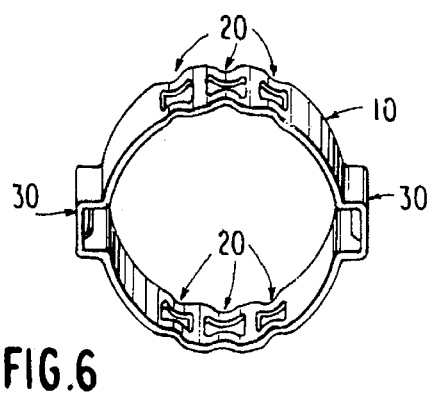

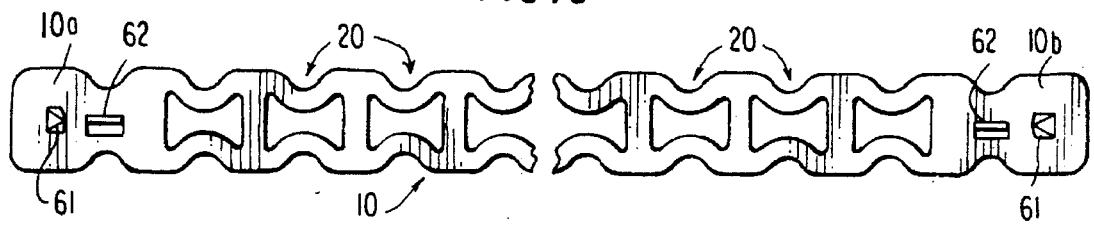
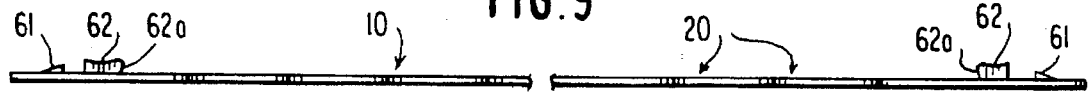
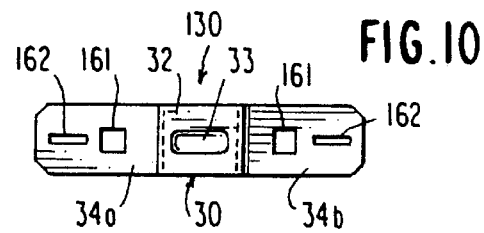
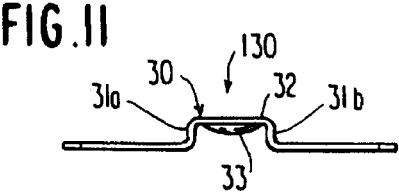
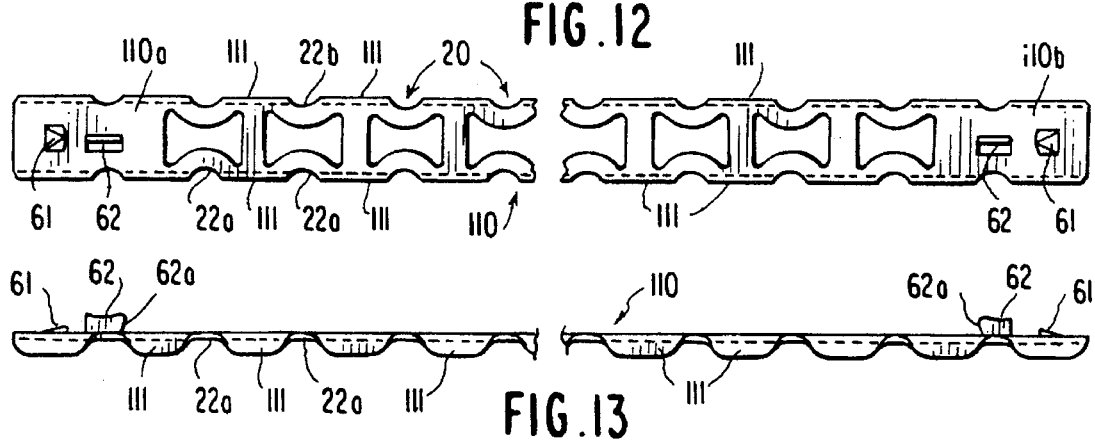
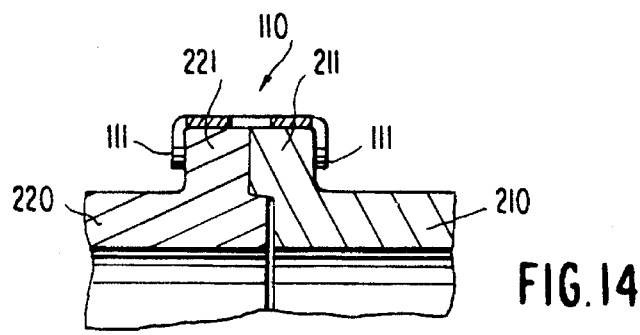

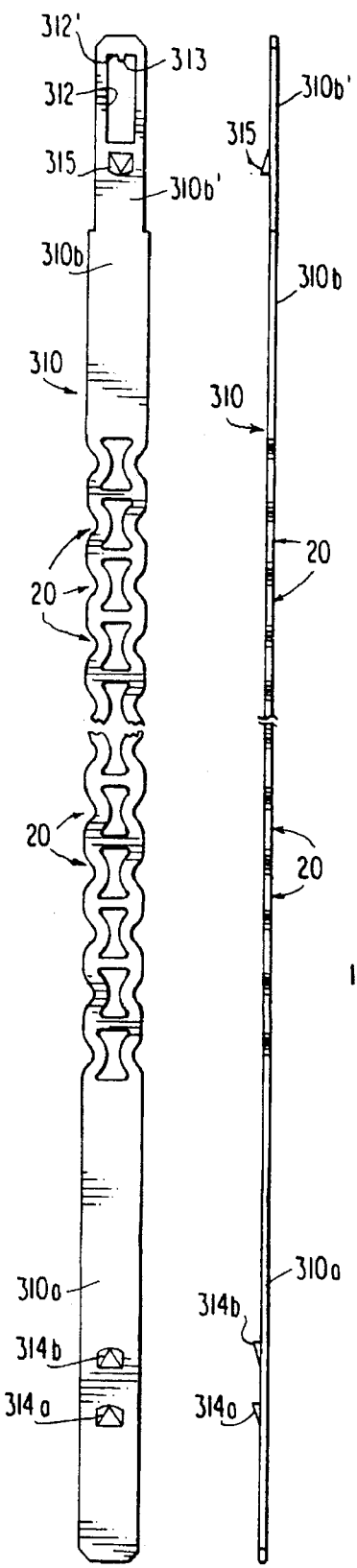
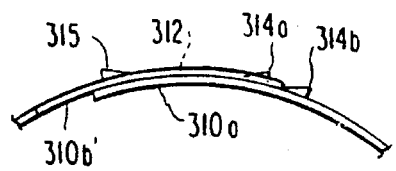
FIG. 17
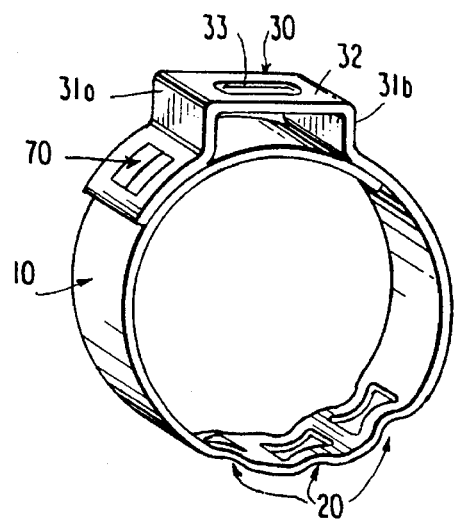
FIG. 18
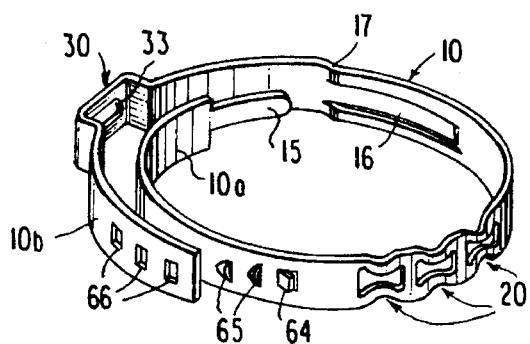
FIG. 19
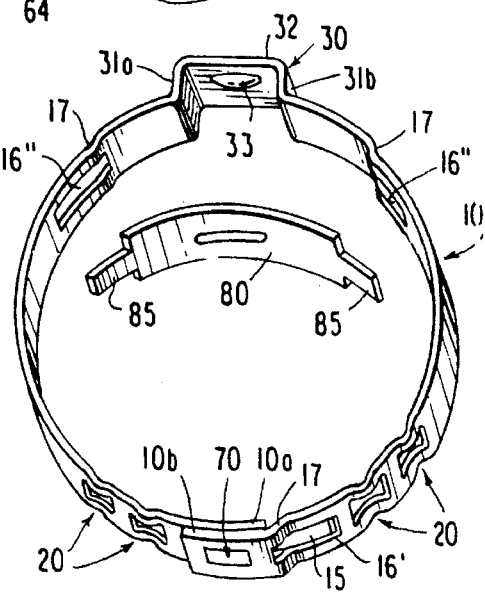
FIG. 20

HOSE CLAMP

This application is a divisional application of my application Ser. No. 07/446,729, filed Dec. 6, 1989, and entitled "Improved Hose Clamp", now U.S. Pat. No. 5,437,081, which itself is a continuation-in-part application of Ser. No. 07/409,798, filed Sep. 20, 1989 and entitled "Earless Clamp," now U.S. Pat. No. 4,987,651, issued Jan. 29, 1991, and of my U.S. Pat. No. 5,305,499, issued Apr. 26, 1994, which is a continuation application of my then application Ser. No. 06/922,473, filed Oct. 23, 1986 and entitled "Hose Clamp", now abandoned which is a continuation application of my then application Serial No. 06/622,765, filed Jun. 20, 1984 and entitled "Hose Clamp", now abandoned.

FIELD OF THE INVENTION

This invention relates to a band material having elastic stretchability, and more particularly to clamp structures made with the use of such band materials.

BACKGROUND OF THE INVENTION

Galvanized steel and stainless steel band materials, which are normally used for clamp structures, are devoid of any significant elastic stretchability in the longitudinal direction of the band material. Nonetheless, these band materials have been and continue to be used almost exclusively with clamp structures that are commercially sold in very large quantities. The use of plastically deformable so-called "Oetiker" ears in conjunction with such band materials played an important role for the success of such clamp structures because the plastically deformable "Oetiker" ears are inherently capable of compensating for temperature and/or pressure changes, i.e., for increases or decreases in the required circumferential length of the clamp structure.

These "Oetiker" ears have been used by the millions in clamp structures made from tubular stock (endless-type clamps) as well as in clamp structures made from band material whose overlapping band portions are mechanically interconnected (open-type clamps). My prior U.S. Pat. No. 2,614,304 relating to a two-ear clamp with two "Oetiker" ears made from tubular stock, my prior U.S. Pat. No. 3,082,498 relating to one-ear clamps made from tubular stock or band material, my prior U.S. Pat. No. 2,847,742 relating to clamp structures made from ladder-type band materials closed by the use of connecting members, my prior U.S. Pat. No. 3,286,314 relating to open-type clamp structures with rivet-like connections for the overlapping band portions, as well as the so-called stepless type clamp structures disclosed in my prior U.S. Pat. Nos. 4,299,012 and 4,315,348 also made from band material of the aforementioned type are representative of clamp structures which have been sold by applicant in very large quantities, whereby so-called "Oetiker" ears for tightening the clamp structure about an object to be fastened thereby are used in all of these clamp structures and whereby these "Oetiker" ears, when plastically deformed into more or less omega shape, automatically compensate for temperature and/or pressure changes.

As tolerances in the external hose dimensions, i.e., in the hose diameters are for all practical purposes unavoidable, these tolerances could be compensated by the degree of closing of the "Oetiker" ears because the clamping band as such offered no significant stretchability in its longitudinal direction. This meant in practice that, for example, the gap underneath an ear plastically deformed with the same force, i.e., the spacing between the transitions from the clamping band into the plastically deformed omega-shaped ear could vary depending on external hose dimensions. This, in turn, led to the use of pneumatic pincer-like tools operating with predetermined pressure to assure a constant closing force in the plastic deformation of the "Oetiker" ears in order to assure substantially the same holding ability of the installed clamp structures. Such pneumatic pincer-like tools, used in large quantities, for example, on the assembly line of the automotive industry, are relatively costly and require relatively expensive pneumatic systems with pressure-reducing valves. The problem of gap size under the ear can be minimized by insert members which can be from relatively thin band material in order to minimize the step in the inner circumferential surface of the clamp, as disclosed in my prior U.S. Pat. No. 3,789,463. However, the use of such insert members increases the cost of the clamp structure. The so-called stepless clamp structures of the type disclosed, for example, in my U.S. Pat. No. 4,237,584, and more specifically in my two aforementioned U.S. Pat. Nos. 4,299,012 and 4,315,348 effectively eliminate the problem of the remaining gap under the plastically deformed ear. However, the use of the pneumatic pincer-like tools operating at constant pressure is still necessary if a constant closing pressure is desired. Moreover, as these pneumatic pincer-like tools operate with a constant pressure, they continue to entail the disadvantage that the ear cannot always be closed to maximize its holding ability. This is so as the degree of closing the ears under those conditions depends on the existing external dimensions of the hose, which may vary as explained above. However, maximum holding conditions with so-called "Oetiker" ears are attainable when the ear is plastically deformed in such a manner that the transitions from the clamping band into the plastically deformed ear are as close as possible in the circumferential direction and when the height of the plastically deformed ear is kept relatively low. Furthermore, as disclosed in the aforementioned parent application, so-called earless clamp structures where space conditions do not permit projecting parts, such as plastically deformed ears, are manufactured for a given diameter of the object to be fastened thereby. In the absence of a plastically deformable "Oetiker" ear and in the absence of any elastic stretchability in the clamping band itself, such earless clamp structures may pose problems when the external dimensions of the object to be fastened thereby, for example, the dimensions of the hose diameter, experience excessively large tolerances.

SUMMARY OF THE INVENTION

It is therefore a principal object of the present invention to provide a band structure made from a material normally devoid of significant elastic stretchability in its longitudinal direction, to which elastic stretchability is imparted in an extraordinarily simple manner by material removal from the band. More specifically, the present invention includes one or more band sections in the band which are characterized by non-linear lateral band portions so shaped that in the presence of tensional forces, the lateral band portions will elastically become less non-linear whereby the cessation of the tensional forces will cause the lateral band portions to elastically return to a more non-rectilinear configuration as long as the tensional forces are below the elastic limit of the band material.

In one embodiment according to the present invention, the lateral band portions are thereby arranged substantially symmetrically with respect to the center longitudinal plane of the band. This will ensure a substantially uniform controlled elastic stretchability even if several sections are used in the band. The lateral band portions are thereby obtained by cut-outs along the sides of the band and in the center area thereof. In one preferred embodiment of the present invention, the cut-outs along the sides of the band are substantially concavely shaped while the cut-outs in the center area of the band at least approximately resemble the shape of an hourglass. Each of the lateral band portions is thereby less than about one-third the normal width of the band, and more specifically are about 15 to about 30% the normal width of the band. The width is thereby chosen taking into consideration desired elasticity and required holding ability in a given application. Furthermore, these lateral band portions may be of substantially constant width over at least a substantial part of their length which is obtained by substantially parallel surfaces left by the lateral cut-outs and the corresponding central cut-out. Preferably, the transversely extending end surfaces of the hourglass-shaped cut-outs pass over into the lateral surfaces by rounded-off corners and the transitions from the concavely shaped cut-outs to the normal width of the band material are thereby also rounded-off. Adjacent sections in accordance with the present invention are connected with each other by transverse web portions of the full band width which are delimited in the band longitudinal direction by mutually opposite end surfaces of adjacent sections.

The availability of an elastically stretchable band material, especially a clamping band material made from galvanized or stainless steel, which is normally devoid of any significant elastic stretchability in its longitudinal direction, offers a number of significant advantages, particularly when used with clamp structures provided with one or more so-called "Oetiker" ears. An elastically stretchable band material, as obtained by the present invention, now permits that the "Oetiker" ear can always be fully closed to maximize its holding ability without regard to the closing forces necessary to achieve the same. This is so as excessive closing forces can now be compensated by elastic stretching of the clamping band itself. The use of pneumatic pincers operating with a predetermined constant pressure is obviated thereby. Additionally, the use of a clamping band having elastic stretchability in its longitudinal direction eliminates pre-existing limitations on the design of the ear, particularly with respect to the height of the ear and the length of the bridging member which had to be designed heretofore, taking into consideration the compensating functions required of the ear. Additionally, the elastically stretchable band material in accordance with the present invention allows greater freedom in the final configuration of the plastically deformed ear to maximize its holding ability because the ear now no longer is called upon to compensate for required changes in length of the clamping band in its circumferential direction. This means, for example, the height of the plastically deformed ear can be kept relatively low by the use of tools, known as such in the art. The reinforcing groove in the bridging member can now also be designed, bearing in mind the possibility of closing the ear to its optimum configuration because the compensating function of the ear can now be assumed in the first instance by the elastically stretchable band.

The desirability of a permanently available spring force in a clamping band had been recognized already in my prior U.S. Pat. No. 3,475,793 in which one or several distributed tensional spring elements were provided in the band. However, apart from cost considerations, these spring elements did not impart elastic stretchability to the band itself.

Furthermore, a clamping band is disclosed in French Patent Publication 2 480 875 in which an elasticity reserve is intended to be achieved by forming one or more zig-zag-shaped narrow band or wire sections of triangular, sinusoidal, trapezoidal or rectangular configuration, as seen in plan view. However, this prior art arrangement entails distinct disadvantages compared to the present invention, according to which non-rectilinear lateral band portions are provided on both sides of the center longitudinal plane of the band to assure substantially uniform controlled elastic stretching regardless of the number of sections which are utilized in a given band material.

As mentioned in my aforementioned parent application, the elastic stretchability of the clamping band is also of importance in so-called earless clamp structures because such earless clamp structures can now be used with hose materials having larger tolerances.

In its broadest aspects, this invention is of importance in all applications utilizing metallic band materials normally devoid of any significant elastic stretchability in the longitudinal direction, for which elastic stretchability of the band material is desired. Furthermore, the band material having elastic stretchability in its longitudinal direction in accordance with the present invention is of particular significance for clamp structures utilizing such band materials because, inter alia, it offers significant advantages in the design and use of so-called "Oetiker" ears and permits the use of so-called earless clamp structures with hoses experiencing larger tolerances.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a plan view on a part of a band provided with three sections imparting elastic stretchability to the band in accordance with the present invention;

FIG. 2 is a plan view on a part of a band more or less consisting over its entire length of repetitive sections imparting elastic stretchability in accordance with the present invention;

FIG. 2a is a perspective view of a connecting member for use in connecting the open ends of a band of the type shown in FIG. 2;

FIG. 3 is a fragmentary perspective view of a modified band of the type shown in FIG. 2 which is curved transversely to increase its spring action;

FIG. 4 is a perspective view of a one-ear clamp structure made from tubular stock and provided with several elastic stretchability-imparting sections in accordance with the present invention;

FIG. 5 is a perspective view showing the one-ear clamp of FIG. 4 in its installed condition;

FIG. 6 is a perspective view of a two-ear clamp provided with several elastic stretchability-imparting sections in accordance with the present invention;

FIG. 7 is a perspective view illustrating the two-ear clamp of FIG. 6 in the installed condition;

FIG. 8 is a plan view on a band structure provided with repetitive elastic stretchability-imparting sections in accordance with the present invention whose free ends are pro- FIG. 9 is a side elevational view of the band structure of FIG. 8;

FIG. 10 is a plan view on a connecting member for use with the band structure of FIGS. 8 and 9;

FIG. 11 is a side elevational view of the connecting member of FIG. 10;

FIG. 12 is a top plan view of a modified band structure in accordance with the present invention, similar to FIG. 8, for connecting together flanged ends of, for example, two pipe-like members;

FIG. 13 is a side elevational view of the band structure of FIG. 12;

FIG. 14 is a partial cross-sectional view, illustrating the application of the band structure of FIGS. 12 and 13 to connect together the flanged ends of two members;

FIG. 15 is a top plan view of a still further modified embodiment of a band structure provided with several elastic stretchability-imparting sections in accordance with the present invention and adapted to be closed without the use of a separate connecting member;

FIG. 16 is a side elevational view of the band structure of FIG. 15:

FIG. 17 is a partial view in the axial direction of the clamp structure illustrated in FIGS. 15 and 16 and showing the same in the interconnected condition;

FIG. 18 is a perspective view of an open-type clamp structure closed by a rivet-like connection and provided with several elastic stretchability-imparting sections in accordance with the present invention;

FIG. 19 is a perspective view of a stepless clamp structure provided with several elastic stretchability-imparting sections in accordance with the present invention;

FIG. 20 is a perspective view of another stepless clamp structure provided with several elastic stretchability-imparting sections in accordance with the present invention;

DETAILED DESCRIPTION OF THE DRAWINGS

Figure 21:
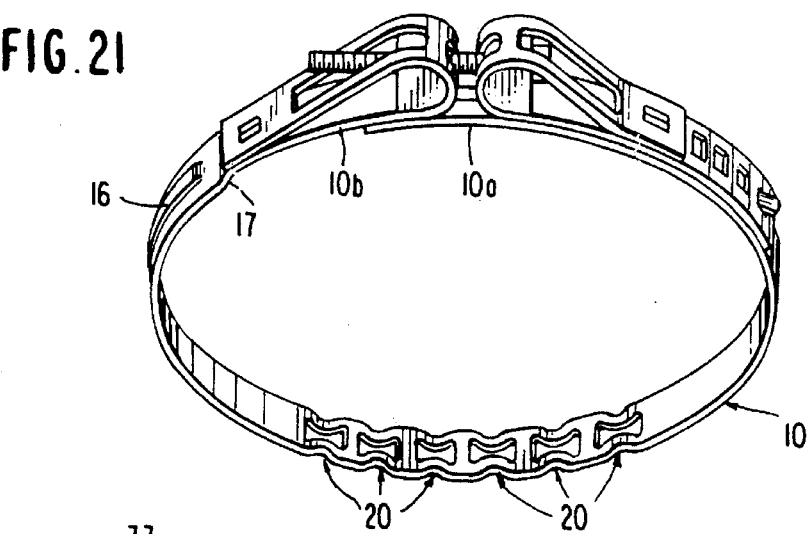
FIG. 21 is a perspective view of a stepless screw-type clamp structure provided with several elastic stretchability-imparting sections in accordance with the present invention.

Referring now to the drawing wherein like reference numerals are used throughout the various views to designate like parts, and more particularly to FIG. 1, reference numeral 10 generally designates in this figure a band made from a material normally devoid of any significant elastic stretchability in its longitudinal direction, made, for example, from galvanized or stainless steel, as used in clamp structures. The band 10 is provided with several sections generally designated by reference numeral 20 so constructed and arranged as to impart elastic stretchability to the band 10 in its longitudinal direction. More specifically, each section 20 consists of non-rectilinear lateral band portions 21a and 21b which are delimited by concavely shaped side surfaces 22a and 22b of the band 10 formed by cut-outs along the sides of the band and by adjacent curvilinear surfaces 24a and 24b formed by the cut-out 23 in the center area of the band. In the illustrated embodiment, the side surfaces 22a and 22b are formed by generally segmentally shaped cut-outs along the sides of the band while the surfaces 24a and 24b are formed in effect by the cut-out 23 in the central area of the band whereby the cut-out 23 is in the form of a window resembling at least approximately an hourglass. The surfaces 22a and 24a as well as the surfaces 22b and 24b thereby extend at least approximately parallel to one another so that the lateral band portions 21a and 21b are of substantially constant width over a major part of their length. The thickness of the lateral band portions 21a and 21b is thereby less than 35% of the normal width of the band, and preferably between about 15% to about 30%. The width is thereby chosen dependent on the material of the band as well as on the desired elastic stretchability and required holding ability of the band with a given (hose) material.

Adjacent sections 20 are connected with each other by web portions 28 that extend over the full width of the band. The web portions 28 are thereby defined by transversely extending end surfaces 27 of the cut-outs 23 in adjacent sections 20. The thicknesses of the web portions 28 is thereby approximately the same as the thickness of the lateral band portions 21a and 21b though they can also be chosen thinner or thicker. To avoid stress peaks, the corners of the cut-outs 23, i.e., the intersections of the end surfaces 27 with the side surfaces 24a and 24b are rounded off as are also the transitions from the concavely shaped side surfaces 22a and 22b to the normal full width of the band.

Tensional forces in the band 10 in the longitudinal direction thereof will cause the non-rectilinear lateral band portions 21a and 21b to become less non-rectilinear. The cessation of these tensional forces will permit the lateral band portions 21a and 21b to return to a more non-rectilinear condition, provided the tensional forces did not exceed the yield strength (elastic limit) of the band material. In actual tests, an elastic stretchability of between 0.4 to about 0.5 mm. was possible with each section 20 for a stainless steel band material having a yield strength or elastic limit of about 2.4 mm. An elastic return by about 0.4 to about 0.5 mm. per section was thereby obtainable even if each section had been stretched by more than that amount provided the total elongation remained below the elastic limit of the material.

The number of sections 20 can be chosen at will to suit the elastic stretchability to be attained with a given band structure. Moreover, the lateral band portions 21a and 21b can be of more or less non-rectilinear configuration whereby cut-outs of a shape differing from the hourglass-like shape shown in FIG. 1 can also be used provided the adopted design and construction assures a substantially uniform controllable elastic stretchability of each of the sections 20 no matter how many such sections ar used. For that reason, the configuration of the sections 20 utilizes non-rectilinear lateral band portions on both sides and is also preferably substantially symmetrical with respect to the longitudinal center plane 29 of the band 10. As exclusively material removal, i.e., cut-outs are used to achieve the non-rectilinear lateral band portions 21a and 21b, which can be achieved by mere stamping or punching operations, the manufacture of a band incorporating the present invention is quite simple and inexpensive and can be realized when a blank for a clamp is stamped out or when a band incorporating continuous sections 20 is manufactured.

As will be explained more fully hereinafter, a band of the type shown in FIG. 1 is of great importance, not only with earless clamps as explained in the aforementioned parent application, but also with various clamp structures made from a normally elastically non-stretchable band material which are tightened about the object to be fastened by plastic deformation of one or several "Oetiker" ears.

FIG. 2 differs from FIG. 1 in that the band 10 is provided with repetitive sections 20 over more or less its entire length, with the possible exception of the end areas for reasons to be explained hereinafter. Each section 20 of FIG. 2, which is similar to the sections 20 of FIG. 1, thereby includes again non-rectilinear lateral band portions 21a and 21b similar to those of FIG. 1. The band material 10 in FIG. 2 may thereby be part of a continuous roll of such band material as shown in my prior U.S. Pat. No. 2,847,742. In that case, cut lengths of such band material may be interconnected by a separate connecting member generally designated by reference numeral 130 as shown in FIG. 2a which is similar to the connecting member of my prior U.S. Pat. No. 2,847,742. The connecting member 130 thereby includes a typical "Oetiker" ear generally designated by reference numeral 30 which consists of two generally outwardly extending leg portions 31a and 31b interconnected by a bridging portion 32 which may be provided with a reinforcing groove 33. The reinforcing groove 33 may thereby be of the type disclosed in my prior U.S. Pat. Nos. 3,402,436 and 3,475,793 and is preferably in the form of a relatively shallow, pan-shaped depression covering at least about 35% and preferably 40 to 60% of the area of the bridging portion 32 in its original condition without reinforcing groove, as disclosed in my copending application Ser. No. 06/922,473, filed Oct. 23, 1986, which is a continuation application of my then copending application Ser. No. 06/622,765, filed Jun. 20, 1984, the subject matter of which is incorporated herein. The corresponding British application was published under NO. 2,160,578 on Dec. 24, 1985, and the corresponding British patent was granted on this application on Jul. 27, 1988. Circumferentially directed extensions 34a and 34b terminate in inwardly bent hooks 35a and 35b of such width as to be able to engage in the wider parts of the hourglass-like cut-outs 23. To the extent necessary, the cut-outs 23 in the central area of the blank may be modified to provide sufficient space for the material thickness of the inwardly extending hooks 35a and 35b. This can be achieved by making the side surfaces 24a and 24b substantially parallel to the normal sides of the band 10 near the end surfaces 27 of the central cut-outs 23.

The use of one or more sections 20 imparting elastic stretchability is of great importance in connection with clamp structures utilizing one or more so-called "Oetiker" ears because the compensation as a result of required changes in the length of the clamping band, be it due to tolerances in the hose material and/or due to temperature and/or pressure fluctuations, will now be compensated in the first instance by the sections 20. This means that the ear 30 can now be designed and closed for maximum holdability with less regard to considerations of elastic compensating ability under normal circumstances. The height of the ear 30, i.e., the length of the legs 31a and 31b as well as the spacing of these legs, i.e., the length of the bridging member 32 can be optimally chosen. Additionally, the ear 30 may be plastically deformed by the application of the requisite closing force in such a manner that in the plastically deformed condition, the transitions 36a and 36b between the circumferential extensions 34a and 34b of the connecting member 130 of FIG. 2a and the plastically deformed leg portions 31a and 31b are as close as possible, i.e., contact or nearly contact one another. Furthermore, appropriate known means may be used to assure that the plastically deformed ear is relatively flat. All of these possibilities contribute to optimization of the holding ability of a given ear.

FIG. 3 illustrates a band structure 10' similar to FIG. 2 with the only difference from the band structure of FIG. 2 that the band is not flat but is now curved, and more particularly concavely curved in the band transverse direction so that during the application of tensional forces it will seek in its installed condition to conform to the object to be fastened thereby which is relatively rectilinear in its axial direction, i.e., is essentially cylindrical in the case of a hose or the like. This will add to the spring action of the band structure when its elastic stretchability-imparting sections 20 are subjected to tensional forces.

FIG. 4 illustrates a one-ear clamp of the type shown in my prior U.S. Pat. No. 3,082,498 which is made from tubular stock and in which the plastically deformable ear generally designated by reference numeral 30 is made in one piece with the clamping band 10. The clamping band 10 is thereby provided with a number of elastic stretchability-imparting sections 20 of the type shown in FIGS. 1 and 2. These sections 20 may thereby extend over the entire circumference of the clamping band or may be chosen to extend only over part thereof depending on the desired degree of elasticity.

FIG. 5 illustrates the clamp structure of FIG. 4 in its installed condition when it is intended to fasten, for example, a hose-like member 40 onto a nipple 50. As can be seen from FIG. 5, the ear can be closed so that the transitions 36a and 36b from the clamping band 10 to the plastically deformed ear 30 approach one another very close while the plastically deformed ear 30 itself is kept relatively low. For normal purposes, the sections 20 are thereby arranged substantially symmetrically with respect to the circumference of the clamping band 10.

FIG. 6 illustrates the present invention applied to a typical two-ear clamp structure of the type disclosed in my prior U.S. Pat. No. 2,614,304 and made from tubular stock in which two ears generally designated by reference numeral 30 are integral with the clamping band 10 and are arranged diametrically opposite one another which offers advantages of a balanced clamp structure when used with rotating members. For the same reasons, the number and location of the elastic stretchability-imparting sections 20 is also preferably chosen symmetrically arranged about the circumference of the clamping band 10. FIG. 7 illustrates the two-ear clamp structure of FIG. 6 in the installed condition about a tubular member 40 intended to be fastened onto a tubular member 50, whereby the tubular member 40 may again be a hose-like member and the tubular member 50 may be part of a nipple structure. As can be seen again in FIG. 7, the ears 30 can be plastically deformed so that the transitions 36a and 36b approach one another closely in the circumferential direction while the height of the ear in its plastically deformed condition can be kept relatively low.

FIGS. 8 and 9 illustrate a blank for a clamp structure adapted to be interconnected by a connecting member of the type shown in FIGS. 10 and 11. The clamping band of FIGS. 8 and 9 generally designated again by reference numeral 10 is thereby provided with elastic stretchability-imparting sections 20 similar to those shown in FIGS. 1 and 2 over nearly its entire length except for the end areas 10a and 10b which are provided with outwardly extending hooks forming part of the mechanical connection. More specifically, each end area 10a and 10b is provided with an outwardly extending cold-deformed hook-like member 61 and with a tab-like combined guide and support hook-like member 62 extending in the longitudinal direction of the clamping band and bent out of the same as disclosed in my prior U.S. Pat. No. 4,622,720. The tab-like member 62 is thereby provided with a guide surface 62a extending upwardly and outwardly away from the free end of the corresponding clamping band end as more fully disclosed in my aforementioned prior U.S. Pat. No. 4,622,720. The connecting member generally designated by reference numeral 130 again includes an "Oetiker" ear generally designated by reference numeral 30 which consists of generally outwardly extending leg portions 31a and 31b interconnected by a bridging portion 32 provided with a reinforcing groove 33 which may be in the form of a relatively shallow pan-shaped reinforcing depression as disclosed in my aforementioned copending application Ser. No. 06/922,473. The circumferential extensions 34a and 34b of the connecting member 130 are provided each with a rectangular opening 161 and a slot-like opening 162 for the hook-like members 61 and 62, respectively. By utilizing a clamping band provided with elastic stretchability-imparting sections 20, the ear 30 in the connecting member 130 can be designed and closed optimally as explained above.

FIGS. 12, 13 and 14 illustrate a modified embodiment of the band and clamp structure shown in FIGS. 8 through 11 for use, for example, in holding together two flanged elements. More specifically, the clamping band generally designated by reference numeral 110 includes again elastic stretchability-imparting sections 20 over its entire length similar to those of FIGS. 1 and 2, except in the band end areas 110a and 110b which are provided again with outwardly extending hook-like members 61 and 62 similar to those of FIGS. 8 and 9. Differing from the clamping band of FIGS. 8 and 9, the clamping band 110 of FIGS. 12 and 13 is provided with inwardly extending tab-like members 111 extending on both sides of the clamping band within the areas where the normal rectilinear side surfaces of the full width clamping-band exist, i.e., in the areas between the concavely shaped side surfaces 22a and 22b. As to the rest, what was said with respect to FIGS. 8–11 applies equally to the embodiment of FIGS. 12–14. The clamp structure of FIGS. 10–13 which now consists of clamping band 110 of FIGS. 12 and 13 and of connecting member 130 of FIGS. 10 and 11 can be used to hold tightly together, for example, the end flanges 211 and 221 of the two pipe-like members 210 and 220 (FIG. 14).

FIGS. 15, 16 and 17 illustrate a clamping band for use in tightening objects where, for example, space conditions preclude the use of a plastically deformable ear. The clamping band generally designated by reference numeral 310 again includes elastic stretchability-imparting sections 20 of the type described in connection with FIG. 1, which extend over a major portion of its length. The end areas 310a and 310b of the clamping band which are devoid of such sections include the means for tightening and mechanically connecting the clamping band 310 about an object to be fastened thereby. More specifically, the tongue-like free end 310b' of the end area 310b, which forms the outer band portion in the installed clamp, is provided with a rectangular opening 312 that includes a small tongue-like projection 313 centrally located in its transverse end face 312' nearer the free end of the band portion 310b. Additionally, the tongue-like extension 310b' includes a cold-deformed outwardly extending hook-like member 315 providing a tool-engaging surface for stretching the clamp during its installation. The opposite band portion 310a is provided with two outwardly extending cold-deformed hook-like members 314a and 314b whereby the hook-like member 314a again provides a tool-engaging surface while the hook-like member 314b is adapted to engage with the end face 312' and with the tongue-like projection 313 when the clamp is installed over an object to be fastened as illustrated in FIG. 17. The width of the opening 312 is thereby such that the hook-like members 314a and 314b can extend therethrough. The cold-deformed hook-like members 314a, 314b and 315 are thereby of any known type and configuration to satisfy the functional requirements.

FIG. 18 illustrates the application of the present invention to a one-ear clamp made from a clamping band 10 provided with elastic stretchability-imparting sections 20 and a plastically deformable "Oetiker" ear 30 integral with the clamping band. The overlapping band portions are mechanically connected with each other by a rivet-like connection generally designated by reference numeral 70 which is of the type disclosed in my prior U.S. Pat. No. 3,286,314. Because of the presence of the sections 20, the aforementioned advantages can again be obtained with the ear 30 of this clamp structure.

FIG. 19 illustrates a so-called stepless clamp structure in which the clamping band 10 is again provided with several elastic stretchability-imparting sections 20. The clamp structure of FIG. 19 which is of the type described in my aforementioned prior U.S. Pat. No. 4,299,012 includes, in addition to a typical "Oetiker" ear 30, a tongue-like extension 15 adapted to engage in a central channel-shaped recess 16 starting from a step 17 and terminating in another step-like configuration (not shown). The channel-shaped recess 16 is thereby provided by pressing out the corresponding central band portions after corresponding longitudinally extending cuts have been made therein. Additionally, the mechanical connection includes one guide hook 64 and two cold-deformed support hooks 65 adapted to engage in corresponding apertures 66 provided in the outer band portion 10b. The "Oetiker" ear which is again provided with a reinforcing groove or depression 33 of the type described in my aforementioned U.S. patents and patent application, again benefits from the presence of the elastic stretchability-imparting sections 20, as explained above.

FIG. 20 illustrates the application of the present invention to a so-called stepless clamp structure of the type more fully described in my prior U.S. Pat. No. 4,315,348 in which the open ends of the band area again mechanically interconnected by a rivet-like connection generally designated by reference numeral 70 of the type described in my aforementioned prior U.S. Pat. No. 3,286,314. The clamping band 10 again includes an "Oetiker" ear 30 provided with a reinforcing groove or depression 33 in its bridging portion 32 as well as several elastic stretchability-imparting sections 20 on both sides of the rivet-like connection 70 which provide the aforementioned advantages as regards the ear 30. To achieve a stepless internal configuration in the area of overlap of the free band ends 10a and 10b, the inner band portion 10a is again provided with a tongue-like extension 15 adapted to engage in an opening 16' starting from a step 17 in the outer band portion 10b and extending in a direction away from the free end of the outer band portion 10b. The insert member 80 intended to bridge the gap under the ear 30 is also provided with tongue-like extensions 85 at its two ends which are adapted to engage in openings 16" beginning in the band 10 in the area of the step 17 and extending in a direction away from the ear 30 in order to achieve a steplessness in the areas of overlap between the insert member 80 and the clamping band.

FIG. 21 illustrates the application of the present invention to a so-called stepless screw clamp of the type disclosed in my prior U.S. Pat. No. 4,521,940 in which the clamping band 10 is again provided with several elastic stretchability-imparting sections 20 that assist and/or even may obviate the use of a spring in the screw-type connection as disclosed in this U.S. patent. As to the rest, the clamp structure illustrated in FIG. 21 corresponds to the clamp structure of FIG. 7 of the U.S. Pat. No. 4,521,940 so that reference should be had to this patent for a more detailed description and operation thereof.

Figure 22:
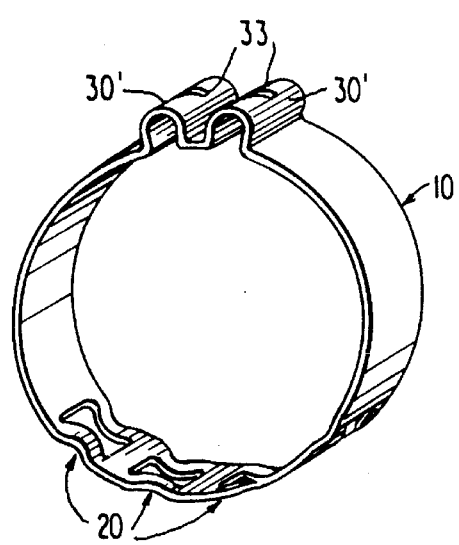
FIG. 22 is a perspective view of a so-called crown-type clamp structure provided with several elastic stretchability-imparting sections in accordance with the present invention.

FIG. 22 illustrates the application of the present invention to a so-called crown-type clamp of the type described in my prior U.S. Pat. No. 3,402,436 in which the two ears 30' provided with reinforcing grooves 33 are sequentially closed and then bent over to form the double crown, as more fully described in this patent. The presence of the elastic stretchability imparting sections 20 in the clamping band 10 thereby facilitates use of a crown-type double-ear configuration in the clamp even under temperature and/or pressure changes.

Figure 23:
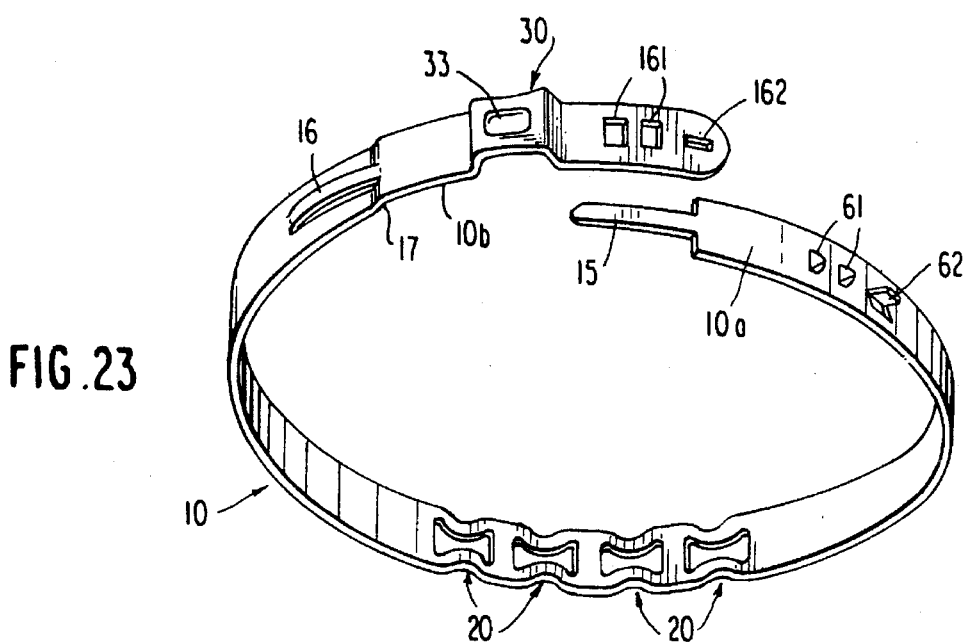
FIG. 23 is a perspective view of a high performance stepless clamp structure in accordance with the present invention provided with several elastic stretchability-imparting sections in accordance with the present invention.

FIG. 23 illustrates the application of the present invention to a stepless clamp structure of the type disclosed in my aforementioned copending application Ser. No. 06/922,473 in which a plastically deformable "Oetiker" ear provided with a relatively shallow pan-shaped reinforcing depression 33 is integral with the clamping band 10. The latter is provided with a mechanical connection consisting of a tab-like combined guide and support hook member 62 and of two outwardly extending cold-deformed support hook members 61 provided in the inner band portion 10a of the clamping band 10 which are adapted to engage in slot-like aperture 162 and rectangular apertures 161, respectively. The inner band portion 10a is additionally provided with a tongue-like extension 15 adapted to engage in the channel-shaped depression 16 provided in the outer band portion 10b and extending in a direction away from the free end of the outer band portion 10b within the area of the step 17. The presence of the sections 20 again benefits the design and use of the ear 30 as explained above.

While I have shown and described several embodiments in accordance with the present invention, it is understood that the same is not limited thereto but is susceptible of numerous changes and modifications as known to those skilled in the art. More particularly, the present invention is equally important to any application in which a band made from a material devoid of elastic stretchability is used and in which controlled elastic stretchability is desired. Furthermore, the present invention is also applicable to other clamp structures utilizing such material, for example, to clamp structures of the type described in my prior U.S. Pat. Nos. 3,579,754 and 4,103,399. Furthermore, the number and location of the elastic stretchability-imparting sections can be chosen at will to satisfy existing requirements in a given application. Additionally, the configuration of the elastic stretchability-imparting sections may be modified to satisfy particular requirements in a given clamp structure or its application, as long as such modifications permit to maintain a controlled uniform elastic stretching of the clamping band within the section or sections provided in the clamping band. I therefore do not wish to be limited to the details shown and described herein but intend to cover all such changes and modifications as are encompassed by the scope of the appended claims.

I claim:

1. A band having a predetermined normal width and made from a material substantially devoid of elastic stretchability in its longitudinal direction, especially a clamping band, to which elastic stretchability in its longitudinal direction is imparted, characterized in that the band comprises further means imparting elastic stretchability to the band in at least one section of the band including non-linear lateral band portions which are substantially concavely shaped, as viewed from the center longitudinal plane and extend on both sides of the band center longitudinal plane, each lateral band portion having a width less than about 40% of the normal width of the band material.

2. A band according to claim 1, wherein the band material consists of galvanized steel or stainless steel.

3. A band according to claim 1, characterized in that the further means are substantially symmetrical with respect to the center longitudinal plane of the band.

4. A band according to claim 1, wherein said further means are formed exclusively by material removal from the band.

5. A band according to claim 1, wherein said further means include at least one centrally disposed window means in the center area of the clamping band which has the shape at least approximately resembling an hourglass.

6. A band according to claim 5, wherein the band has side surfaces which are curved concavely within the area of a respective window means, as viewed in plan view on the band.

7. A band according to claim 6, wherein the band includes at least two such sections, and a transversely extending web portion between each two adjacent sections.

8. A band according to claim 5, wherein each of the side surfaces of said band are shaped to follow at least approximately the shape of adjacent sides of the window means.

9. A band according to claim 8, wherein the lateral band portions are formed between a respective side surface and the corresponding adjacent side of the window means, and wherein each of the two lateral band portions is at least of approximately constant width over a substantial part of its length.

10. A band according to claim 1, wherein said further means is formed by at least one cut-out in the center area of the band as well as cut-outs along the sides of the band within the area of a respective cut-out in the center area.

11. A band according to claim 1, wherein the band is substantially flat in a direction transverse to the longitudinal direction.

12. A band according to claim 1, wherein the band is concavely shaped in a direction transverse to the longitudinal direction to provide further spring action in the band.

13. A band, especially a clamping band, according to claim 1, wherein the band includes several repetitive sections.

14. A band according to claim 13, which essentially consists of such sections over substantially its entire length.

15. A band according to claim 14, wherein all sections are substantially identical.

16. A band, especially a clamping band, which includes a center area and side surfaces and which is made from a material substantially devoid of any significant elastic stretchability in its longitudinal direction, characterized by further means to impart elastic stretchability to the band in its longitudinal direction, said further means including non-rectilinear lateral band portions at least approximately symmetrically arranged on opposite sides of the center longitudinal plane of the band, each of said lateral band portions being substantially concavely shaped with respect to and as viewed from the center longitudinal plane of the band so as to increase the distance of each lateral band portion from the center longitudinal plane on both sides thereof from a point of minimum distance in the center area so that the band is operable to become less non-rectilinear upon application of tensional forces to the band means and to elastically assume again a more non-linear configuration upon cessation of the tensional forces.

17. A band according to claim 16, wherein said further means include at least one centrally disposed window means in the center area of the clamping band which has the shape at least approximately resembling an hourglass.

18. A band according to claim 17, wherein each of the side surfaces of said band are shaped to follow at least approximately the shape of adjacent sides of the window means.

19. A band according to claim 18, wherein the lateral band portions are formed between a respective side surface and the corresponding adjacent side of the window means, and wherein each of the two lateral band portions is at least of approximately constant width over a substantial part of its length.

20. A band, especially a clamping band, which has a predetermined width in the band transverse direction, a center area and side surfaces and which is made from a material substantially devoid of any significant elastic stretchability in its longitudinal direction, characterized by further means to impart elastic stretchability to the band in its longitudinal direction, said further means including at least one section with non-rectilinear lateral band portions at least approximately symmetrically arranged on opposite sides of the center longitudinal plane of the band, each of said lateral band portions being substantially concavely shaped with respect to and as viewed from the center longitudinal plane of the band so that the distance of each lateral band portion from the center longitudinal plane increases from a point of minimum distance in the center area of each lateral band portion.

21. A band according to claim 20, wherein each of said substantially concavely shaped non-rectilinear band portions is delimited externally by substantially concavely shaped side surfaces and internally by adjacent curvilinear surfaces, and wherein said substantially concavely shaped non-rectilinear band portions terminate in areas of substantially full band width and are operable to become less non-rectilinear upon application of tensional forces to the band means and to elastically assume again a more non-linear configuration upon cessation of the tensional forces.

22. A band according to claim 20, wherein said further means includes at least one centrally disposed window means in the center area of the band, and wherein each of the side surfaces of said band is shaped to follow at least approximately the shape of a respective adjacent side of the window means.

23. A band according to claim 22, wherein each of the two lateral band portions is at least of approximately constant width over a substantial part of its length.

24. A band according to claim 23, wherein a respective window means has the shape at least approximately resembling an hourglass.

25. A band according to claim 24, wherein the further means includes at least two such sections, and wherein a transversely extending web portions formed by a full band width part connects each two adjacent sections.

26. A band according to claim 20, wherein respective curvilinear surfaces of said substantially concavely shaped lateral band portions define window means in the area of the center longitudinal plane.

27. A band according to claim 26, wherein said concavely shaped lateral band portions terminate in band portions extending over the full width of the clamping band means.

28. A band according to claim 20, wherein said non-rectilinear lateral band portions are separated from each other by a window means disposed therebetween.

\* \* \* \* \*